Patented Apr. 22, 1941

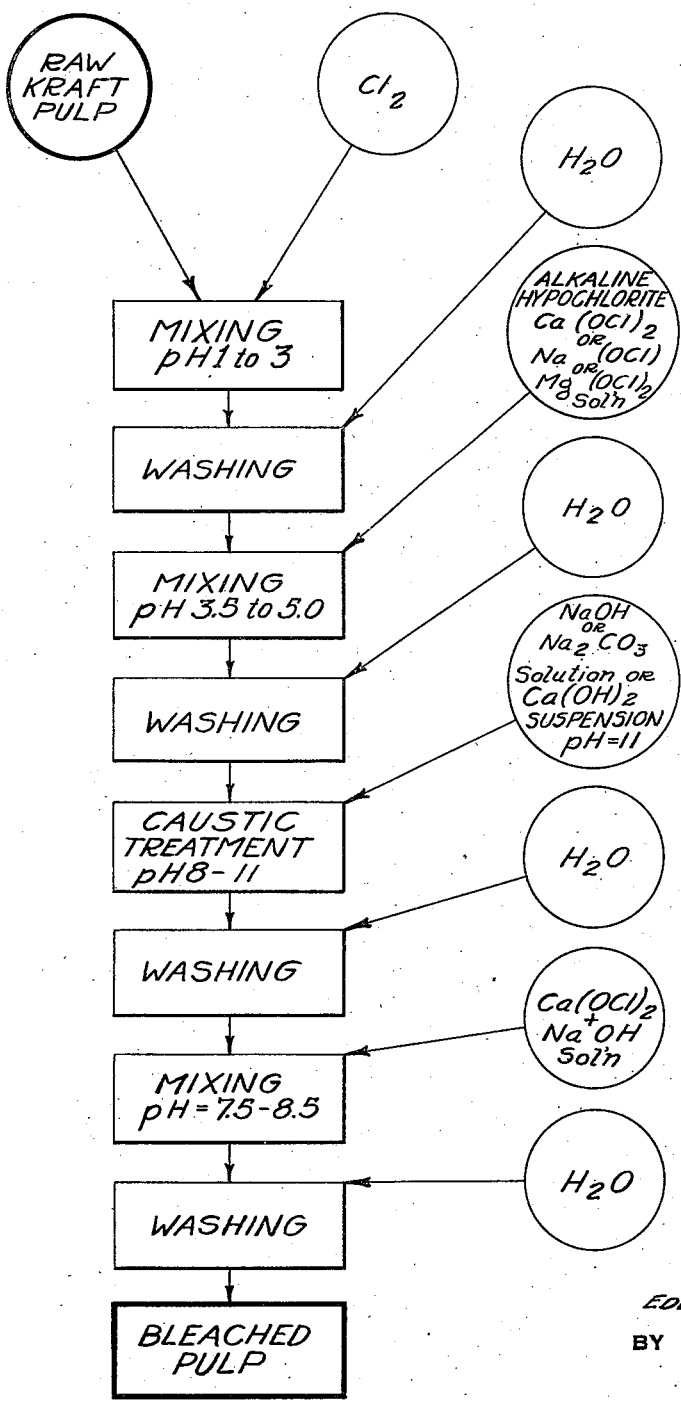

2,239,606

UNITED STATES PATENT OFFICE 2,239,606

METHOD OF BLEACHING KRAFT PULP

Edward H. Hill and Ralph Hooks, Covington, Va., assignors to West Virginia Pulp and Paper Company, New York, N. Y., a corporation of Delaware Application August 25, 1938, Serial No. 226,676

8 Claims. (Cl. 8—105)

Our present invention relates to improved methods of bleaching pulp, especially pulp used in paper making obtained by cooking cellulose-containing materials, and our improved method is especially applicable to difficultly bleachable pulps such as kraft.

Our invention is predicated essentially upon treatment of pulp with chlorine or compounds yielding same under specified conditions of hydrogen ion concentration. The first step consists in subjecting the pulp in aqueous suspension to the action of elemental chlorine at temperatures preferably not exceeding moderate room temperatures, e. g., 25° C. When chlorine is dissolved in water it forms hypochlorous acid (HClO) and hydrochloric acid (HCl) in equimolar quantities. In the bleaching of kraft pulp, for example, when sufficient chlorine or chlorine water is added all at once to complete the reaction, hydrochloric acid is formed in an amount to give a pH in solution of from 1 to 3. For an easier bleaching pulp, e. g., soda pulp, less chlorine will be added and a higher pH of the menstruum will result. When the reaction under the conditions so stated is complete the pulp is preferably washed to remove such of the chlorinated products formed as are water-soluble. The next step is to subject the pulp to the action of chlorine in the form of hypochlorite (ClO⁻) in an altered pH solution, i. e., of a pH of 3.5 or greater. The pH at this stage may exceed 3.5 considerably, but for bleaching of kraft or other pulp difficult to bleach, it should not be preferably in excess of 5 and certainly not on the alkaline side. This condition of pH may be most conveniently obtained by adding to the preferably washed pulp a solution of alkaline hypochlorite (e. g., bleaching powder, sodium or magnesium or other soluble hypochlorite salt), it being found that normally when the solution of the alkaline hypochlorite is added the amount is small enough so that the residual acidity of the pulp is sufficient to give a pH in the solution as low as 3.5. In any event the pH at this point will be controlled to give a final value in excess of 3.5, usually 4.5, which is found most desirable for the pulp undergoing treatment, it being noted that the pH of the menstruum is higher at the beginning, quickly becoming more acid upon standing. Under these circumstances we have found a further reaction, presumably of a different type, to take place, resulting in a further yield of soluble chlorinated products. At this point the advantage of removing the soluble chlorinated products of the first stage treatment is apparent as otherwise such products absorb quantities of bleach added in the second stage so that a quantity of bleach is needlessly lost. Furthermore, it is desirable not to add more chlorine in the first stage than will react with the non-cellulosic compounds not only because considerable loss of chlorine will result during the succeeding washing step, but if the washing step be omitted, and the solution neutralized with lime, for example, the calcium salts precipitated will be difficult to remove from the pulp. Also formed by the two-stage treatment are chlorinated products which are soluble only in alkali, and to remove these products the pulp, desirably after preliminary water-wash, is treated with an alkaline solution, preferably caustic soda, of a pH, say, not exceeding 11.5. The pulp has now had removed from it the more refractory of the non-cellulosic materials and may be subjected to one or more conventional mild bleaching treatments customarily employed, preferably consisting of an alkaline hypochlorite or other oxidizing agents, whereupon a fully bleached pulp is obtained.

The invention will be further understood by reference to the following illustrative example taken with the annexed drawing comprising a so-called flow sheet illustrating the improved method. The quantities given are per 100 pounds of pulp on the dry basis.

*Example.*—To a quantity of kraft pulp was added 6.1 pounds elemental chlorine in the form of chlorine water per 100 pounds of pulp started with, the consistency of the solution being 3½%. The temperature, as above stated, should not run greatly in excess of 25° C. as in such case the cellulose may be unduly attacked. The reaction was completed in from 30 to 45 minutes, as revealed by tests on the solution for chlorine. The pulp was water-washed and then subjected to the action of calcium hypochlorite solution, the pH of the solution or menstruum in which the pulp was suspended having been adjusted to give a pH of around 4.5 at the end of this treatment. The quantity of bleach required for this stage was sufficient to give 2.5 pounds of equivalent chlorine per 100 pounds of pulp, and the temperature was held at 35° C. It is desirable that the temperature at this point not exceed 50° C. The reaction was complete within fifteen minutes. Often two minutes will be a sufficient time. The pulp was water-washed, then treated at a temperature around 50° C. with sufficient alkali solution (NaOH, Na₂CO₃, Ca(OH)₂, etc.) to result in the pulp suspension having a pH above 8.0. The pulp was then water-washed and subjected to the action of an alkaline hypochlorite solution. A pH at this stage between 7 and 8 is preferred and if the hypochlorite solution is insufficiently alkaline, free alkali may be added to obtain the desired pH. A higher pH is not harmful except that it is wasteful of alkali. The amount of bleach required was equivalent to 1.5 pounds of chlorine per 100 pounds of pulp. The temperature at this stage was around 35° C., although a higher or lower temperature may be used. This treatment was complete after about 2 hours, whereupon the pulp was water-washed. This made the total quantity of bleach consumed 10.1 pounds available chlorine per 100 pounds of pulp. When necessary the alkaline hypochlorite stage may be repeated. The pulp without additional alkaline hypochlorite bleach had a color of 263 on the Hess-Ives tint-photometer.

The details given above are susceptible to considerable variation without affecting the final result. For difficultly bleachable pulps such as kraft the more intensive action had by maintaining the hypochlorite stage at a pH of from 3.5 to 5 (preferably at 4.5) is to be regarded as exceedingly important. Because of the intensive reaction which occurs this reaction is often complete within two minutes. Therefore, the time of contact should be relatively short, say not greatly in excess of fifteen minutes, or otherwise the cellulose will be attacked. Furthermore, following the second stage, when bleaching kraft pulp, for example, the washing step may be omitted and the step next following of washing with alkali carried out, although it is obvious that the more acid is left in the pulp, the greater will be the amount of alkali needed to accomplish the result sought. Especially in the second or acid hypochlorite stage it is desirable that the treatment be carried out in equipment which is free from iron. Some variations in pH may be tolerated due to conditions of the mill water available. The alkaline hypochlorite solution called for may comprise any of those customarily used in the art, e. g., calcium hypochlorite (bleaching powder), sodium hypochlorite, magnesium hypochlorite, etc., or mixtures thereof. Paper made from pulp so bleached is substantially as strong as that made from unbleached pulp.

Various other changes in procedure will occur to those skilled in the art without departing from the spirit of our invention or the scope of the appended claims.

We claim:

1. In a method of bleaching kraft pulp, the steps which comprise treating an aqueous suspension of the pulp with chlorine in an amount just sufficient to act upon substantially all the non-cellulosic constituents of the pulp and allowing the reaction to take place until substantially all the chlorinatable non-cellulosic matter has been reacted upon, then removing water-soluble reaction products from the pulp, treating the same with hypochlorite solution at a pH in excess of 3.5 and less than 7 and removing from the pulp alkali-soluble reaction products by treatment with an alkali solution.

2. In a method of bleaching kraft pulp, the steps which comprise treating an aqueous suspension of the pulp with chlorine in an amount not substantially in excess of that required to act upon the non-cellulosic constituents of the pulp and allowing the reaction to take place until substantially all the chlorinatable non-cellulosic matter has been reacted upon, then removing water-soluble reaction products from the pulp, treating the same with hypochlorite solution at a pH in excess of 3.5 and less than 7 and removing from the pulp alkali-soluble reaction products by treatment with an alkali solution.

3. In a method of bleaching kraft pulp, the steps which comprise treating an aqueous suspension of the pulp with chlorine in an amount not substantially in excess of that required to act upon the non-cellulosic constituents of the pulp and allowing the reaction to take place until substantially all the chlorinatable non-cellulosic matter has been reacted upon, then removing water-soluble reaction products from the pulp, treating the same with hypochlorite solution and maintaining the pH of the resulting menstruum at approximately 4.5 until a further reaction has taken place, and removing from the pulp alkali-soluble reaction products by treatment with an alkali solution.

4. The method of bleaching kraft pulp which comprises the steps of treating an aqueous suspension of the pulp with chlorine in an amount just sufficient to act upon substantially all the non-cellulosic constituents of the pulp and allowing the reaction to take place until substantially all the chlorinatable non-cellulosic matter has been reacted upon, then removing water-soluble reaction products from the pulp, treating the same with hypochlorite solution at a pH in excess of 3.5 and less than 7, removing from the pulp alkali-soluble reaction products by treatment with an alkali solution and then subjecting the pulp to an alkaline hypochlorite treatment.

5. The method of bleaching kraft pulp which comprises the steps of treating an aqueous suspension of the pulp with chlorine in an amount not substantially in excess of that required to act upon the non-cellulosic constituents of the pulp and allowing the reaction to take place until substantially all the chlorinatable non-cellulosic matter has been reacted upon, then removing water-soluble reaction products from the pulp, treating the same with hypochlorite solution and maintaining the pH not substantially in excess of 5 nor substantially less than 3.5 until a further reaction has taken place, removing from the pulp alkali-soluble reaction products by treatment with an alkali solution and then subjecting the pulp to an alkaline hypochlorite treatment.

6. The method of bleaching kraft pulp which comprises the steps of treating an aqueous suspension of the pulp with chlorine to give a pH of the solution in which the pulp fibres are suspended of from 1 to 3, allowing the reaction to take place until substantially all the chlorinatable non-cellulosic matter has been reacted upon, terminating the reaction by removing the excess chlorine and washing the pulp, adding a hypochlorite solution such as to create a pH of the solution between 3.5 and 5, allowing a further reaction to take place, treating the pulp with an alkaline solution, water-washing and continuing the bleaching treatment by subjecting the pulp to the action of a hypochlorite solution having a pH in excess of 7.

7. In a method of bleaching kraft pulp to remove the refractory color bodies and leave an easily bleachable pulp, the steps comprising treating an aqueous suspension of the pulp with chlorine in an amount to give a pH of the solution in which the pulp fibers are suspended of from 1 to 3 and allowing the reaction to take place until substantially all the chlorinatable non-cellulosic matter has been reacted upon, then removing water-soluble reaction products from the pulp, treating the same with hypochlorite solution at a pH in excess of 3.5 and less than 7 and removing from the pulp alkali-soluble reaction products by treatment with an alkali solution.

8. The method according to claim 1, in which the pulp is maintained in the hypochlorite solution for a period of from two to fifteen minutes.

EDWARD H. HILL.
RALPH HOOKS.